April 11, 1967
M. C. ROZZI
3,313,838
REACTION OF CHLOROSULFONIC ACID WITH
ALKOXYLATED ALKYL PHENOLS
Filed July 1, 1963
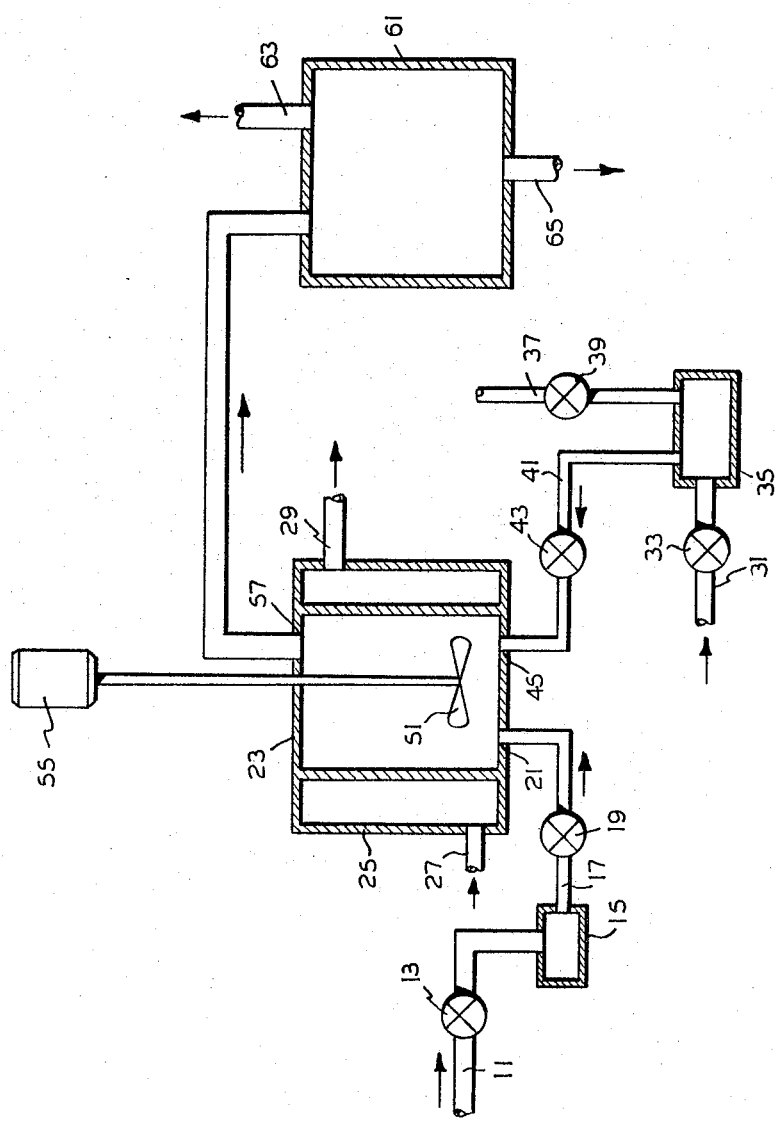
INVENTOR
MARCELLUS C. ROZZI
BY
ATTORNEYS

United States Patent Office

3,313,838
Patented Apr. 11, 1967

3,313,838
REACTION OF CHLOROSULFONIC ACID WITH ALKOXYLATED ALKYL PHENOLS
Marcellus C. Rozzi, Colonia, N.J., assignor to General Aniline & Film Corporation, New York, N.Y., a corporation of Delaware
Filed July 1, 1963, Ser. No. 291,643
4 Claims. (Cl. 260—458)

The present invention relates to an improved process and apparatus for the continuous production of sulfur containing organic compounds. It has particular application to a process and apparatus by which there may be produced continuously the reaction products of a strong sulfating or sulfonating agent, particularly such as chlorosulfonic acid, with suitable organic compounds, particularly alcohols. A special feature of the invention is that it makes it possible to carry out the sulfation or sulfonation rapidly and continuously without the charring and discoloration which commonly occur in reactions of this type.

Many processes, types of apparatus, and production systems have been devised for the reaction of chemicals of the general type to which this invention relates. The treatment of various chemicals with sulfuric acid or with oleum or related materials, such as sulfur trioxide, sulfane, etc., is a procedure generally well known in the art. Such processes are employed extensively as are also the conventional reactors and other equipment. It has also been known in the prior art that there are often advantages in the use of chlorosulfonic acid as a sulfating agent instead of such materials as oleum, sulfan, or sulfuric acid. This is because the chlorosulfonic acid has less tendency to char, to discolor, and to affect the quality of the finished product. Both quality problems and problems of yield may be encountered when using the other sulfating agents. Even with chlorosulfonic acid, however, there is some tendency to cause char and discoloration, particularly where contact is continued for an extended time period and/or temperatures are allowed to rise unduly. Hence an important purpose of the present invention is to devise both a process and reaction equipment or apparatus of suitable design which will prevent such char and discoloration and will also prevent the loss of yield which often occurs in the prior art practices.

Another and primary purpose of this invention is to provide a reactor system and process (1) having a very short retention time for the components, (2) so devised as a minimize color degradation, (3) also, an object is to provide a system, both process- and apparatus-wise, which minimizes foaming problems that may be encountered in the prior art processes, especially where gaseous reaction products or by-products must be removed, such, for example, as hydrogen chloride.

According to the present invention, a reaction vessel is provided which is designed both for temperature control and also for a relatively short contact time between the reaction components. The apparatus is also designed to obtain immediate, adequate and intimate mixing between the reaction components so as to make possible a more complete reaction in a minimum of time. Such a controlled reaction will minimize the degree of color degradation and the undesirable side reactions which otherwise occur and cause formation of objectionable by-products.

In reactions of the general type under consideration, particularly those wherein gaseous or vaporous by-products are formed, such as hydrogen chloride which is evolved when chlorosulfonic acid is used, it is important to minimize the foaming difficulties. The present apparatus has foaming reduction as a further object.

By designing apparatus which will obtain intimate mixing and hence adequate contacting of acid and organic material in a minimum of time, the reaction goes forward quickly to produce the desired primary products. The reactant materials or, rather, the desired reaction product, may then be removed very shortly and neutralized. This will put an end to possible further degradation. In broad terms, then, the invention involves a process for reacting a strong chemical agent, particularly a liquid sulfating or sulfonating agent, especially chlorosulfonic acid, with an organic material, preferably an alcohol or related oxygenated organic material, in such a manner as to minimize charring and discoloration. The invention further comprises a method and a means for energetically mixing the organic material and the sulfating or sulfonating agent under some pressure. The mixing means are equipped with a prime mover having a power input sufficient to effect the necessary intimate mixing in a minimum of time. After mixing and reaction over a suitable but short time and at appropriately controlled temperature, the reacted mixture is promptly passed into a receiver. There it is degasified and may also be neutralized thereafter by contacting with a neutralizing agent such as an alkali metal hydroxide, for an appropriate time period. The receiver or neutralizing vessel is so designed as to permit prompt separation of gaseous and vaporous products of the reaction or by-products such as hydrogen chloride, as mentioned above. By affording this opportunity for degasification in a vessel which is essentially unpressurized, a substantially complete separation of the acidic gaseous by-product is obtained almost instantly. Hence, the principal reaction product may then promptly be neutralized batchwise, after the gas has been separated, to obtain the desired final product.

More specifically, the process involves the production of useful materials, such as surface active agents, which may be obtained by sulfation of certain organic alcohols or related hydroxy materials. The sulfated products of the longer chain alcohols in particular make excellent detergents as is well known. The products also have other uses which are well known in the art.

A particularly desirable starting material is of the general type which is derived from condensation of alkylated phenols with alkylene oxides, the latter being such, for example, as ethylene oxide or propylene oxide. These organic starting materials, which often have certain surface active properties in and of themselves without sulfation or sulfonation, are adapted to produce excellent reaction products when sulfated with a suitable treating agent. As mentioned above, this agent preferably is chlorosulfonic acid.

Hence, organic materials, containing hydroxyl groups, and being otherwise of the general type described above, can be reacted very effectively in the apparatus and according to the process of this invention, to produce excellent products in high yields. At the same time the disadvantages of the prior art apparatus and processes are avoided and undesirable discoloration and contamination of the products are avoided.

The invention will be more fully understood by referring to the accompanying drawing and to the detailed description which follows. In the drawing, the single figure shows diagrammatically a preferred apparatus which is well adapted to carry out the improved process and obtain the advantages discussed above.

Referring particularly now to the drawing, the alcohol or related organic material may be supplied through a line 11 under control of a valve 13 and through a storage vessel to equalize the flow, the latter being indicated at 15. From vessel 15 the product flows under suitably applied pressure through line 17, under control of valve 19, into the inlet 21 at the bottom of a mixing and reaction vessel 23. The vessel 23 preferably is jacketed as indicated at 25 so that its temperature may be adequately controlled. An inlet for the temperature control fluid such as water, which is used for cooling is indicated at 27 and an outlet is shown at 29.

The sulfating or sulfonating agent is supplied through a line 31 under control of a valve 33. From thence it goes to a suitable zone or vessel 35 where it is pressurized, for example, by the introduction of a pressurized inert gas from a line 37 under control of a valve 39. Obviously, by proper control of valve 39, the vessel may be pressurized as desired by admitting the desired quantity of inert gas. An outlet line 41, which may be provided with a control valve 43 if desired, enters the reaction vessel at the bottom thereof through an inlet 45.

The reaction vessel 23 is provided with an effective stirrer 51 which is equipped with a sufficiently powerful motor 55 to apply substantial power to the mixing device 51. The reason for this is that it is essential to obtain very quickly a high degree of intimate contacting of the sulfating agent and the organic alcohol or equivalent. This is accomplished by mixing at high shear rates, applying power at the rate of at least 2.5 watts per gram per minute to all the contents of the mixing vessel.

In general, it is desirable to impart an energy of at least 2.5 and up to 10 watts per gram per minute, based on the quantity of material in the mixing vessel at any given time. A preferred range is between about 3.5 and 7 watts.

The residence time in the mixing zone and reactor also is of importance. For minimum charring and discoloration of the product, contact should be very quick and complete so as to avoid over-oxidation of some portions of the organic material. Hence, it is desirable to force the mixed material into and through the reactor 23 at a fairly rapid rate so as to not prolong residence in the mixer. This is particularly true of portions of the liquids which are not adequately mixed. Thus the mixing unit is designed to minimize poorly mixed portions, as far as is consistent with rapid throughput. The mixer imparts a shearing energy at a high rate to the mixture. The pressure, e.g., of 5 to 50 p.s.i.g., as applied, for example, from line 17 and from lines 37 and 41 to the respective components in the reactor is such that the materials will flow out rapidly, after thorough mixing, through the outlet line 57. This outlet is located at the top of the reaction vessel and it leads into a separation vessel 61 where the evolving gas of reaction, hydrogen chloride primarily, can be separated from the reaction product. The inlet of vessel 61 is preferably at the top of this vessel and the vessel is so proportioned that a total separation time of between about 1 and 10 minutes is permitted during continuous production. It is desirable to effect quick gas separation to minimize degradation of the main reaction product.

A preferred time range of residence in reactor vessel 23 is between about 2 and 5 minutes, although it may be somewhat less or more, i.e., about 1 to 10 minutes.

The separation vessel 61 normaly is substantially at atmospheric pressure, although some moderate pressure may be applied if desired. It is equipped with an outlet 63 at or near the top which is open to the atmosphere or connected to a suitable receiver, not shown, at near atmospheric pressure. Through this outlet 63 the gaseous and vaporous by-products, HCl, $H_2$, etc., of the reaction may quickly be removed.

In the reaction of chlorosulfonic acid with organic alcohols and similar materials of the type for which this process is particularly designed, there is a very substantial production of hydrogen chloride and some water vapor may be evolved, although the reaction temperature is kept well below the boiling point of water, preferably around 40 to 60° C. A temperature of about 50° C. is particularly suitable for the reactor 23.

The by-product material in vapor or gaseous form is quickly released through line 63 so that foaming in the vessel 61 is minimized. The main product of reaction, which is normally in liquid form, may then be withdrawn from the bottom of the vessel through outlet line 65 without substantial entrainment of hydrochloric acid. From outlet 65 the liquid reaction product may be taken to a suitable neutralizing zone where it may be treated with a suitable neutralizing agent such, for example, as ammonium hydroxide or the equivalent. Ordinarily this neutralization is done batchwise, although it may be done continuously if desired.

The invention will be further illustrated by reference to a specific example.

*Example 1*

A hydroxy organic compound, i.e., a complex alcohol, available under the trade name "Igepal CO-430" was reacted with chlorosulfonic acid in the manner generally explained above. This material is understood to be a condensation product of an alkyl phenol, wherein the alkyl group apparently has a chain length of about 9 carbon atoms, with ethylene oxide in suitable ratios. This particular product apparently contains about 43% by weight of ethylene oxide, based on the alkyl phenol. It has the general formula:

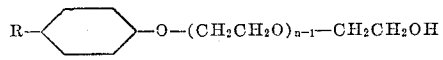

where R is alkyl and $n$ equals the number of moles of ethylene oxide. The organic material, per se, has some surfactant properties and has been used as a wetting agent as well as for emulsifying certain materials. It has a specific gravity very slightly greater than that of water, e.g., about 1.02 to 1.03, its gravity being considerably less than that of the acid.

The organic alcohol, "Igepal CO-430," was continuously pumped into the apparatus shown in the drawing, employing a pressure pump not shown. The chlorosulfonic acid was propelled into the mixer vessel from a container 35 by means of application of inert gas pressure from line 37. The feed rates were adjusted to give a retention time of between 2 and 5 minutes in the reactor vessel. The molar ratio of chlorosulfonic acid to the organic material was about 1.25 to 1.

The coolant in the jacket of the reactor vessel was controlled so as to keep the temperature of the reaction at about 50° C. The activity of the "Igepal CO-430" was at least 95% and the yield from the reactor was 100%.

From the reaction vessel 23 the material was taken to the neutralizing vessel 61 where the gases were separated. The liquid product, thus degasified, was neutralized batchwise by addition of ammonium hydroxide. The salt content of the finished product was 0.001%. The neutralized product showed an activity of 26.1% and was light in color. Overall yield, based on the original organic material, "Igepal CO-430," was 88.5%.

It will, of course, be understood that the apparatus and the process may be applied to other organic alcohols or hydroxy materials, although those of the general type described above are particularly suitable for this reaction. If desired, where the reaction is carried out intermittently, the vessel 61 may be used to neutralize the liquid sulfated product, after degasification. In this case, a small mixer may be installed in the separation vessel 63 although this mixer need not have the high power characteristics of the mixer in the main reaction vessel.

Obviously, various changes may be made in the equipment and in the process and it is intended by the claims which follow to cover such modifications as would suggest themselves to those skilled in the art as far as the prior art properly permits.

What is claimed is:

1. A process which comprises energetically mixing chlorosulfonic acid and an alkoxylated alkyl phenol under a pressure of about 5–50 p.s.i.g. and with a power input of at least 2.5 watts per gram per minute while reacting said material and agent for a reaction time of about 1 to 10 minutes, controlling the reaction temperature to keep it below about 60° C., then passing the mixture into a separation zone, allowing the reaction to subside while removing vaporous and gaseous HCl therefrom and recovering a substantially unchanged and non-discolored sulfonated alkoxylated alkyl phenol.

2. Process according to claim 1 wherein the reaction time is between about 2 and 5 minutes.

3. Process according to claim 1 wherein the power input is between 3.5 and 7 watts per gram per minute.

4. Process according to claim 1 in which the alkoxylated alkyl phenol is a condensation product of alkylated phenol and an agent selected from the group consisting of ethylene oxide and propylene oxide.

References Cited by the Examiner

UNITED STATES PATENTS

| | | | |
|---|---|---|---|
| 2,187,244 | 1/1940 | Mills | 260—459 |
| 2,190,136 | 2/1940 | Oberg | 23—284 |
| 2,613,218 | 10/1952 | Stoneman | 260—458 X |
| 2,616,936 | 11/1952 | Mannen et al. | 260—458 X |
| 2,634,287 | 4/1953 | Fincke | 260—459 |
| 2,673,211 | 3/1954 | Blinoff | 260—459 |
| 2,697,031 | 12/1954 | Herbert | 23—284 |
| 2,708,675 | 5/1955 | Slagh | 260—457 |
| 2,758,977 | 8/1956 | Knowles et al. | |
| 2,771,484 | 11/1956 | Blaser et al. | 260—459 |
| 2,828,331 | 3/1958 | Marisic et al. | 260—401 X |
| 2,854,476 | 9/1958 | Chenicek et al. | 260—457 X |
| 2,865,958 | 12/1958 | Davies et al. | 260—686 X |
| 2,923,728 | 2/1960 | Falk et al. | 260—459 |
| 2,931,822 | 4/1960 | Tischbirek | 260—459 |
| 2,970,165 | 1/1961 | Michel et al. | 260—459 |
| 3,024,258 | 3/1962 | Brooks et al. | 260—459 X |
| 3,055,929 | 9/1962 | Bozzetto | 260—459 |
| 3,169,142 | 2/1965 | Knaggs et al. | 260—457 |

FOREIGN PATENTS 164,105  11/1953  Australia.

OTHER REFERENCES

Ser. No. 83,244, Reibnitz (A.P.C.), published June 1942.

CHARLES B. PARKER, *Primary Examiner.*

JOSEPH P. BRUST, *Examiner.*

FLOYD D. HIGEL, *Assistant Examiner.*